(12) United States Patent
Zhuang et al.

(10) Patent No.: US 11,396,102 B2
(45) Date of Patent: Jul. 26, 2022

(54) ROBOTS, METHODS, COMPUTER PROGRAMS AND COMPUTER-READABLE MEDIA

(71) Applicant: Emotech Ltd., London (GB)

(72) Inventors: Hongbin Zhuang, London (GB); Szu-Hung Lee, London (GB); Martin Riddiford, London (GB); Patrick Hunt, London (GB); Graham Brett, London (GB); Robert Butterworth, London (GB); Douglas Morton, London (GB); Ben Mahon, London (GB)

(73) Assignee: Emotech Ltd., London (GB)

( * ) Notice: Subject to any disclaimer, the term of this patent is extended or adjusted under 35 U.S.C. 154(b) by 803 days.

(21) Appl. No.: 16/355,408

(22) Filed: Mar. 15, 2019

(65) Prior Publication Data
US 2019/0275680 A1     Sep. 12, 2019

Related U.S. Application Data

(63) Continuation of application No. PCT/GB2017/052767, filed on Sep. 18, 2017.

(30) Foreign Application Priority Data

Sep. 16, 2016   (GB) ...................... 1615850

(51) Int. Cl.
*B25J 19/02*   (2006.01)
*B25J 11/00*   (2006.01)
*G06F 3/16*    (2006.01)
*G06N 3/00*    (2006.01)

(52) U.S. Cl.
CPC ......... *B25J 11/0005* (2013.01); *B25J 19/026* (2013.01); *G06F 3/167* (2013.01); *G06N 3/008* (2013.01)

(58) Field of Classification Search
CPC ..... B25J 19/026; B25J 11/0005; G06F 3/167; G06F 3/165; G06F 3/013; G06N 3/008; G10L 15/22; G10L 2015/223
See application file for complete search history.

(56) References Cited

U.S. PATENT DOCUMENTS 5,521,321  A     5/1996  Liu
10,636,260 B1 *  4/2020  Young ................... A63F 13/285
(Continued)

FOREIGN PATENT DOCUMENTS

CN    201257299 Y    6/2009
CN    103984409 A    8/2014
(Continued)

OTHER PUBLICATIONS

Ogata et al., Attractive telepresence communication with movable and touchable display robot, 2015, IEEE, p. 179-184 (Year: 2015).*
(Continued)

*Primary Examiner* — McDieunel Marc
(74) *Attorney, Agent, or Firm* — EIP US LLP

(57) ABSTRACT

A robot comprises a first part and a second part moveable relative to the first part. The robot operates in an audio output mode in which the first and second parts are in a first configuration relative to each other and in which the robot outputs audio from an array of speakers using an audio output technique. The robot operates in a user interaction mode in which the first and second parts are in a second, different configuration relative to each other and in which the robot interacts with a user. The robot is configured to change from the audio output mode to the user interaction mode in response to the robot detecting a trigger event. Changing from the audio output mode to the user interaction mode comprises causing the first part to lift up relative to the second part.

20 Claims, 14 Drawing Sheets

(56) References Cited

U.S. PATENT DOCUMENTS

| 11,161,236 | B2* | 11/2021 | Mallinson | G05D 1/0094 |
| 11,161,250 | B2* | 11/2021 | Yeom | G05D 1/0214 |
| 2002/0198626 | A1 | 12/2002 | Imai et al. | |
| 2010/0076600 | A1 | 3/2010 | Cross et al. | |
| 2012/0209433 | A1 | 8/2012 | Rodriguez | |
| 2015/0314454 | A1 | 11/2015 | Breazeal et al. | |

FOREIGN PATENT DOCUMENTS

| CN | 104718007 A | 6/2015 |
| CN | 104951077 A | 9/2015 |
| EP | 2492850 A1 | 8/2012 |
| KR | 1020090017786 A | 2/2009 |
| WO | 2013063381 A1 | 5/2012 |

OTHER PUBLICATIONS

Miner et al., An interactive virtual reality simulation system for robot control and operator training, 1994, IEEE, p. 1428-1435 (Year: 1994).*

Jean et al., Development of an office delivery robot with multimodal human-robot interactions, 2012, IEEE, p. 1564-1567 (Year: 2012).*

Csapo et al., Multimodal conversational interaction with a humanoid robot, 2012, IEEE, gp. 667-672 (Year: 2012).* https://techcrunch.com/video/emotech-presents-olly-your-emotive-personal-robot-assistant/519311089, Emotech Ltd., Dec. 7, 2015.

http://www.phonearena.com/news/Sony-shows-off-the-Smart-Bluetooth-Speaker-BSP60-a-dancing-speaker-that-can-complement-the-Xperia-Z3_id70127, Jun. 5, 2015.

http://www.onenewspage.com/video/20151207/3651149/Emotech-Presents-Olly-Your-Emotive-Personal-Robot-Assistant.htm.

Corrected Search Report dated Mar. 24, 2017 for Application No. GB1615850.3.

International Search Report and Written Opinion dated Mar. 18, 2018 for PCT Application No. PCT/GB2017/052767.

Search Report dated Mar. 13, 2017 for Application No. GB1615850.3.

Chinese Office Action dated Nov. 30, 2021 for Chinese Application No. 201780070600.7.

* cited by examiner

ROBOTS, METHODS, COMPUTER PROGRAMS AND COMPUTER-READABLE MEDIA

CROSS-REFERENCE TO RELATED APPLICATIONS

This application is a continuation of International Application No. PCT/GB2017/052767, filed Sep. 18, 2017, which claims priority to UK Application No. GB 1615850.3, filed Sep. 16, 2016, under 35 U.S.C. § 119(a). Each of the above-referenced patent applications is incorporated by reference in its entirety.

BACKGROUND OF THE INVENTION

Technical Field

The present invention relates to robots, methods, computer programs and computer-readable media.

Description of the Related Technology

Robots are becoming more prevalent in society and are being provided with increased functionality. Interaction with robots can still however feel somewhat unnatural and artificial. It would be desirable to facilitate more natural and meaningful interaction with robots.

SUMMARY

According to a first aspect of the present invention, there is provided a robot comprising a first part and a second part movable relative to the first part, the robot being configured to operate in an audio output mode in which the first and second parts are in a first configuration relative to each other and in which the robot is operable to output audio from an array of speakers using a first audio output technique and to operate in a user interaction mode in which the first and second parts are in a second, different configuration relative to each other and in which the robot is operable to interact with a user of the robot, wherein the robot is configured to change from the audio output mode to the user interaction mode in response to the robot detecting a first trigger event, wherein changing from the audio output mode to the user interaction mode comprises causing the first part to lift up relative to the second part.

According to a second aspect of the present invention, there is provided a method of controlling a robot, the robot comprising a first part and a second part movable relative to the first part, the method comprising the robot: operating in an audio output mode in which the first and second parts are in a first configuration relative to each other and in which audio is output from an array of speakers using a first audio output technique; detecting a first trigger event; changing, in response to the detecting of the first trigger event, from the audio output mode to a user interaction mode in which the first and second parts are in a second, different configuration relative to each other and in which user interaction is conducted with a user of the robot; and operating in the user interaction mode, wherein changing from the audio output mode to the user interaction mode comprises causing the first part to lift up relative to the second part.

According to a third aspect of the present invention, there is provided a computer program comprising instructions which, when executed, cause a device to perform a method of controlling a robot, the robot comprising a first part and a second part movable relative to the first part, the method comprising the robot: operating in an audio output mode in which the first and second parts are in a first configuration relative to each other and in which audio is output from an array of speakers using a first audio output technique; detecting a first trigger event; changing, in response to the detecting of the first trigger event, from the audio output mode to a user interaction mode in which the first and second parts are in a second, different configuration relative to each other and in which user interaction is conducted with a user of the robot; and operating in the user interaction mode, wherein changing from the audio output mode to the user interaction mode comprises causing the first part to lift up relative to the second part.

According to a fourth aspect of the present invention, there is provided a computer-readable medium comprising such a computer program.

According to a fifth aspect of the present invention, there is provided a robot comprising a first part, a second part and a third part, wherein the first part is pivotally coupled to the second part and the second part is rotatably coupled to the third part, wherein the robot is configured to cause the first part to pivot relative to the second part and/or to cause the second part to rotate relative to the third part in response to detecting one or more trigger events.

According to a sixth aspect of the present invention, there is provided a disc-shaped robot comprising a first part, a second part and a third part, wherein the robot is configured to cause the first part to rotate relative to the second part and/or to cause the second part to pivot relative to the third part.

According to a seventh aspect of the present invention, there is provided a robot comprising a first part, a second part, a third part, a first motor and a second motor, the first motor being operable to cause the first part to pivot relative to the second part and the second motor being operable to cause the second part to rotate relative to the third part.

According to an eighth aspect of the present invention, there is provided a device comprising a first part and a second part movable relative to the first part, the device being configured to operate in a first operating mode in which the first and second parts are in a first configuration relative to each other and to operate in a second, different operating mode in which the first and second parts are in a second, different configuration relative to each other, the device being configured to change from the first operating mode to the second operating mode in response to the device detecting a first trigger event.

Further features and advantages will become apparent from the following description, given by way of example only, which is made with reference to the accompanying drawings.

DETAILED DESCRIPTION OF CERTAIN INVENTIVE EMBODIMENTS

Examples described herein may facilitate more natural and meaningful interaction with robots. In particular, examples described herein may facilitate change between different operating modes of robots based on natural change points. For example, a robot may change to an operating mode with a relatively high level of user interactivity when user interaction with the robot appears to be likely to happen and/or is currently happening. A robot may also change to an operating mode with a relatively low level of user interactivity when user interaction with the robot appears to be less likely to happen and/or is currently not happening. Robots described herein may provide a single device that can operate in different modes, each having different user interactivity levels, and may configure themselves in physically different configurations in the different operating modes. The robots described herein may, for example, configure themselves differently in the different operating modes to reflect the respective levels of interactivity, providing a more natural and life-like user experience.

Like items are denoted herein using like references signs but incremented by different multiples of 100 in different figures.

Figure 1:
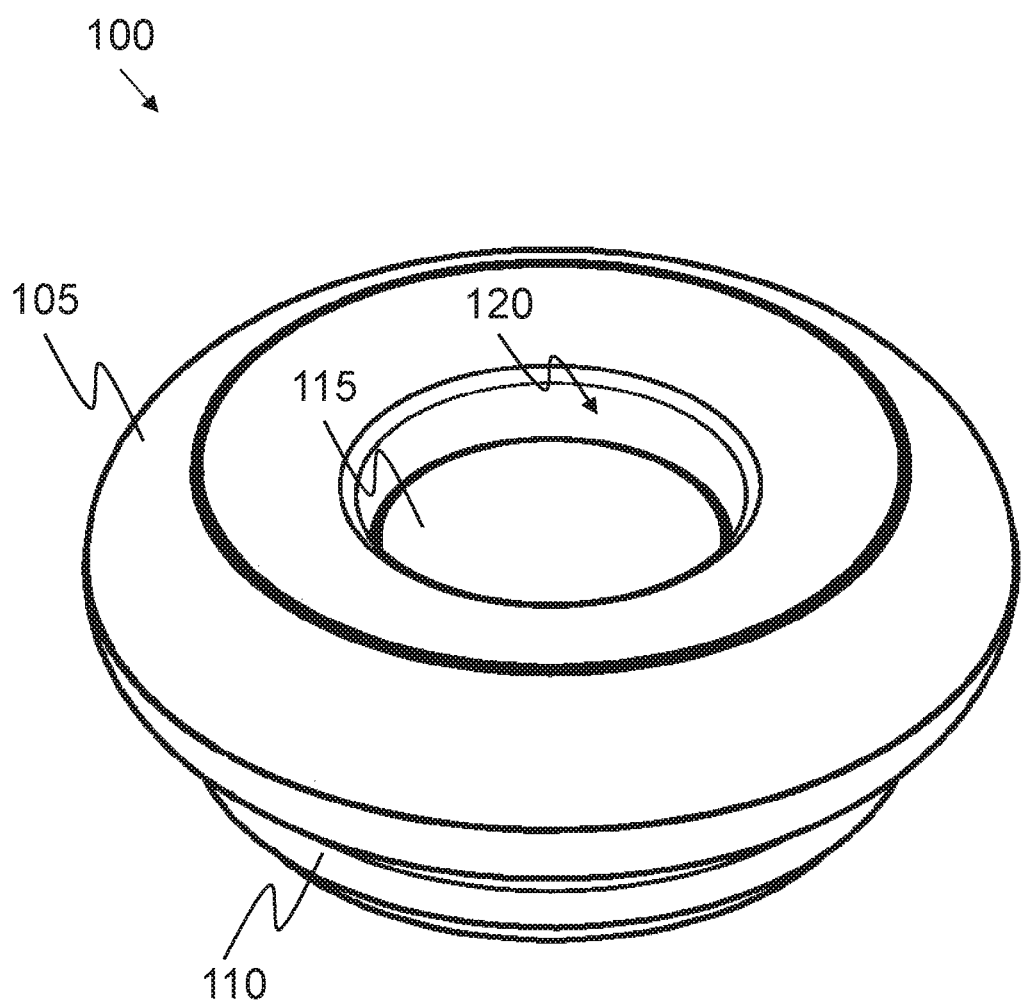
FIG. 1 shows a front perspective view of an example of a robot in accordance with an embodiment of the present invention, the robot being in an audio output mode.

Referring to FIG. 1, there is shown schematically an example of a device 100. For convenience and brevity, in the specific examples described in more detail below, the device 100 is typically a robot. A robot may be considered to be a guided agent. A robot may be guided by one or more computer programs and/or electronic circuitry. It will be understood however that the device 100 may be of a different type.

The robot 100 may exhibit artificial intelligence (AI). For example, the robot 100 may use environmental factors to mimic cognitive functions associated with the human mind, such as learning and problem-solving.

The robot 100 may be an autonomous robot. An autonomous robot may be considered to be a robot that performs functions with a relatively high degree of autonomy compared to non-autonomous robots.

The robot 100 may be a social robot. A social robot may be considered to be an autonomous robot that interacts with one or more other entities based on social behaviours and/or social rules associated with its role. Examples of such entities include, but are not limited to, users or other agents.

The robot 100 has a first part 105. In this example, the first part 105 is an upper part of the robot 100.

The robot 100 also has a second part 110. In this example, the second part 110 is or forms part of a base of the robot 100.

The robot 100 is configured to operate in a first operating mode. In this example, the robot 100 is depicted while operating in the first operating mode. In this example, the first operating mode is an audio output mode. In this example, the robot 100 is operable, in the audio output mode, to output audio from an array of speakers. An array of speaker may be an arrangement of multiple speakers. Examples of audio include, but are not limited to, music, audio book content and the like. The robot 100 does not necessarily output audio when in the audio output mode.

In this example, the robot 100 is operable, in the audio output mode, to output audio from the array of speakers using a first audio output technique. The first audio output technique may be an omnidirectional audio output technique. The first audio output technique may be a 360 degree (or '360°') audio output technique. An omnidirectional or 360 degree audio output technique may be used to provide audio at equal or substantially equal levels around the robot 100. The audio may be provided in this way in all directions around the robot 100. This may provide a room-filling and/or more balanced audio experience.

The first operating mode may alternatively or additionally be a low-power mode, a power-saving mode, a rest mode and/or a sleep mode.

The first part 105 of the robot 100 is movable relative to the second part 110 of the robot 100. Movement of the first part 105 relative to the second part 110 may involve the first part 105 moving while the second part 110 remains stationary, the second part 110 moving while the first part 105 remains stationary and/or the first part 105 moving while the second part 110 also moves.

In the first operating mode, the first part 105 and the second part 110 are in a first configuration relative to each other. In this example, the first configuration is a rest configuration.

In this example, the first part 105 is toroidal in shape. In this example, the second part 110 comprises a raised region (or 'ridge') 115 corresponding to a hole (or 'opening') 120 in the first part 105.

In this example, the first part 105 is configured to be in contact with at least part of the raised region 115 of the second part 110 when the first part 105 and second part 110 of the robot 100 are in the first configuration relative to each other. This may facilitate a relatively compact and space-saving configuration and/or may improve acoustic properties when the robot 100 is in the audio output mode.

The robot 100 is configured to change from the audio output mode to a second operating mode. The change from the audio output mode to a second operating mode may involve a discrete change, for example a switch between operating modes. Alternatively, the change from the audio output mode to the second operating mode may involve a continuous change, for example a transition or transformation. The change from the audio output mode to the second operating mode may involve the robot 100 operating in one or more intermediate operating modes. Alternatively, there may be no intermediate operating modes.

In this example, the robot 100 is configured to change from the audio output mode to the second operating mode in response to the robot 100 detecting a first trigger event.

The first trigger event may be a first predetermined voice command. The first predetermined voice command may be a word, phrase or the like, which the robot 100 recognises as being the first trigger event. The first trigger event may be another type of audible event. Examples of other types of audible event include, but are not limited to, a predetermined noise, sound, alarm or the like. The robot 100 may detect the first predetermined voice command using one or more microphones. In some examples, the robot 100 uses a microphone array comprising three or more microphones. In such examples, the robot 100 may also detect the direction of the source of the voice command. As such, the robot 100 may comprise an array of microphones comprising at least three microphones and may be configured to use the array of microphones to determine a direction of a source of a voice command. In other examples, an array of microphones comprising two or more microphones may be used. The array of microphones may be used to determine a direction of a source of a voice command and/or of a sound other than a voice command, for example an alarm.

The first trigger event may be a presence of the user of the robot 100. The first trigger event may be a presence of one or more predetermined users of the robot 100. The one or more predetermined users of the robot 100 may have interacted with the robot 100 previously and therefore may be recognised by the robot 100. The robot 100 may have been authorised to interact with the one or more predetermined users. The presence of the user may be detected using one or more cameras, one or more microphones and/or in another manner. As such, the robot 100 may change from the audio output mode to the second operating mode when the robot 100 notices the user. Where the robot 100 includes a microphone array and/or one or more cameras, the robot 100 may be able to detect the direction of the user at the moment the robot 100 detects the presence of the user.

The first trigger event may be a current time of day being a first predetermined time of day. For example, the robot 100 may be configured to change from the first operating mode to the second operating mode when the user wakes up in the morning. The robot 100 may comprise alarm clock functionality. The robot 100 may be able to determine the time to change from the audio output mode to the second operating mode based on an alarm time set by the user. The first trigger event may additionally or alternatively be a current day of the week being a first predetermined day of the week and/or a current month being a first predetermined month and/or a current year being a first predetermined year.

The robot 100 may be configured to change from the audio output mode to the second operating mode in response to the robot 100 detecting one or more of multiple first trigger events. As such, any one of multiple different trigger events and/or trigger event types may be used to initiate the change from the audio output mode to the second operating mode. This may provide additional flexibility in using the robot 100 and a more natural interaction where multiple stimuli can lead to interaction with the robot 100.

As such the robot 100 may change from the audio output mode to the second operating mode proactively without requiring specific user input to initiate the change. The change may be proactive where the robot 100 proactively changes at a particular time of day for example. The robot 100 may alternatively or additionally change from the audio output mode to the second operating mode reactively using specific user input to initiate the change. The change may be reactive where the robot 100 reactively changes in response to detecting a particular phrase.

In this example, the robot 100 is disc-shaped in at least one operating mode. In this example, the robot 100 is disc-shaped in the audio output mode. The robot 100 is disc-shaped in the audio output mode in that the robot 100 is relatively thin and substantially circular in shape.

Figure 2:
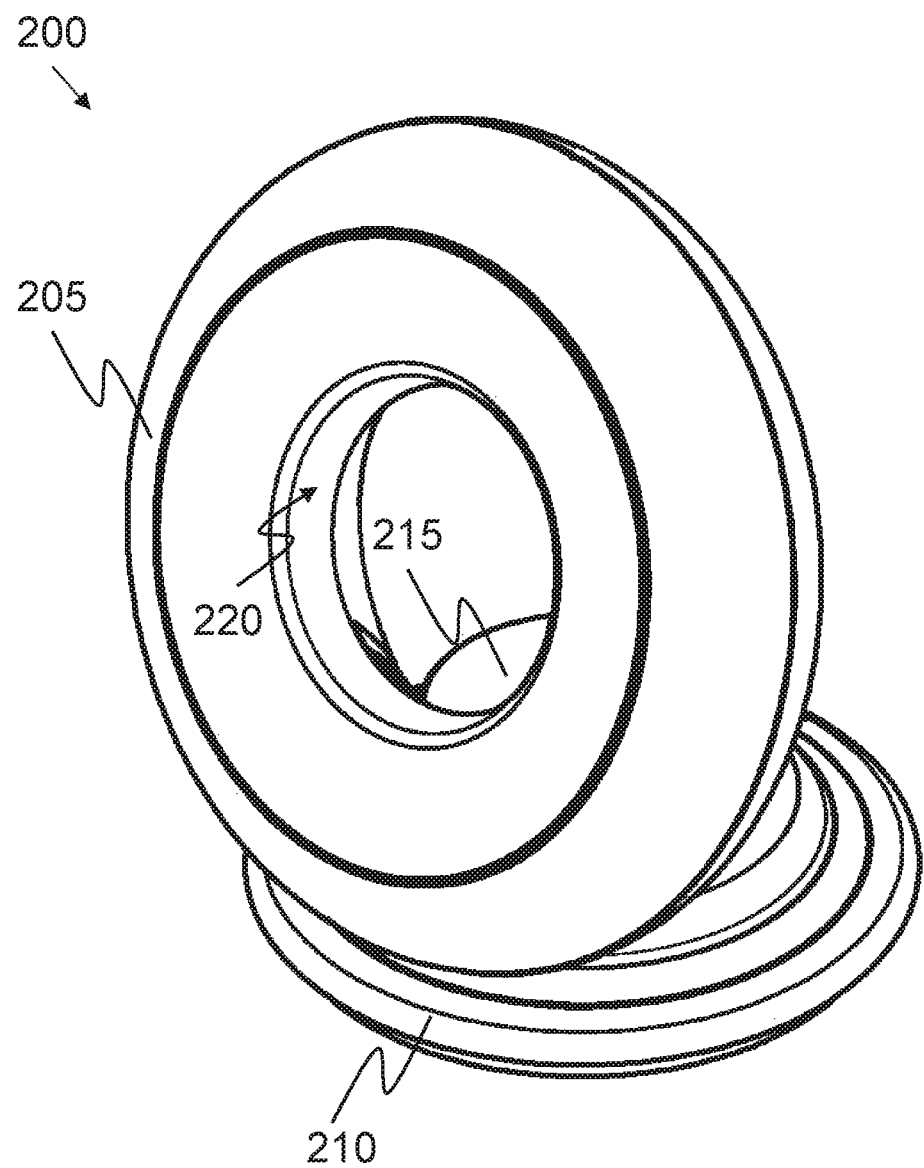
FIG. 2 shows a front perspective view of the example of the robot shown in FIG. 1, the robot being in a user interaction mode.

Referring to FIG. 2, there is shown schematically an example of a robot 200.

In this example, the robot 200 is operating in the second operating mode. In this example, the second operating mode is a user interaction mode. The robot 200 is operable to interact with a user of the robot 200 in the user interaction mode. Interaction may involve two-way communication between the user and the robot 200. The robot 200 may exploit aspects of its personality and character in the user interaction mode. The second operating mode may additionally or alternatively be a wake-up mode and/or an awake mode.

The second operating mode is different from the first operating mode. The second operating mode may be different from the first operating mode in that at least one function may be performed in the first operating mode which may not be performed in the second operating mode. The second operating mode may be different from the first operating mode in that no functions that may be performed in the first operating mode may be performed in the second operating mode. At least one function that may be performed in the first operating mode may also be performed in the second operating mode.

The robot 200 may be operable to output audio from some or all of the array of speakers using a second audio output technique in the user interaction mode. The second audio output technique may be the same as or different from the first audio output technique described above. For example, the robot 200 may be configured not to perform an omni-directional or 360 degree audio output technique in the user interaction mode.

In the second operating mode, the first part 205 and the second part 210 are in a second configuration relative to each other. In this example, the second configuration is a wake-up configuration.

The second configuration of the first part 205 and the second part 210 relative to each other is different from the first configuration of the first part 105 and the second part 110 relative to each other. For example, the angle subtended between one or more reference features of the first part 105, 205 and one or more reference features of the second part 110, 210 is different in the first and second configurations of the first part 105, 205 and the second part 110, 210. The change from the first configuration of the first part 105 and the second part 110 relative to each other to the second configuration of the first part 205 and the second part 210 relative to each other may comprise varying the angle subtended between the one or more reference features of the first part 105, 205 and the one or more reference features of the second part 110, 210. The angle may vary between 0° corresponding to a horizontal configuration and 90° corresponding to a vertical configuration.

In this example, the first part 205 is configured not to be in contact with the raised region 215 of the second part 210 when the first part 205 and second part 210 of the robot 200 are in the second configuration relative to each other.

The robot 200 may be configured to change from the user interaction mode to the audio output mode in response to the robot 200 detecting a second trigger event.

The second trigger event may be different from the first trigger event. For example, the second trigger event may be of the same type as the first trigger event but the specific triggering event may be different. Alternatively, the type of the second trigger event may be different from the type of the first trigger event.

The second trigger event may be a second predetermined voice command. The second predetermined voice command may be different from the first predetermined voice command. The second predetermined voice command may be a word, phrase or the like which the robot 200 recognises as being the second trigger event.

The second trigger event may be an absence of the user of the robot 200. The robot 200 may change to a less interactive or non-interactive mode when the user is no longer present.

The second trigger event may be a current time of day being a second predetermined time of day. The second predetermined time of day may be different from the first predetermined time of day.

The second trigger event may be expiry of a predetermined time period. The predetermined time period may be associated with an amount of time since a most recent interaction with the user of the robot 200. For example, the robot 200 may be configured to change from the user interaction mode to the audio output mode when the user has not interacted with the robot 200 for a given period of time.

The robot 200 may be configured to perform at least one function differently for different users. As such, the robot 200 may provide a less artificial and more natural user experience.

The robot 200 may be configured to perform the at least one function, which is performed differently for different users, based on an identity of the user of the robot 200. As such, the robot 200 may tailor its operations to specific users, providing a more personal and natural user experience.

The robot 200 may be configured to determine at least one personality characteristic based on the identity of the user. The robot 200 may be configured to perform the at least one function, which is performed differently for different users, based on the determined at least one personality characteristic. As such, the robot may tailor its personality to specific users, providing a more personal and natural user experience.

The robot 200 may be configured to perform the at least one function, which is performed differently for different users, in the audio output mode. For example, different users may have different audio output preferences. As such, a more personal user experience may be provided in relation to audio experiences.

The robot 200 may be configured to perform the at least one function, which is performed differently for different users, in the user interaction mode. As such, a more personal user experience may be provided in relation to interactions with the robot 200.

The robot 200 may be configured to perform at least one predetermined function in one of the audio output mode and the user interaction mode and not to perform the at least one predetermined function in the other of the audio output mode and the user interaction mode. As such, the robot 200 may have identifiably different operating modes. The robot 200 may be configured to perform omnidirectional or 360 degree audio processing in the audio output mode and not to perform omnidirectional or 360 degree audio processing in the user interaction mode. The robot 200 may be configured to interact with the user in the user interaction mode and not to interact with the user in the audio output mode. The robot 200 may however still react to user input in the audio output mode, for example by changing to the user interaction mode.

Figure 3:
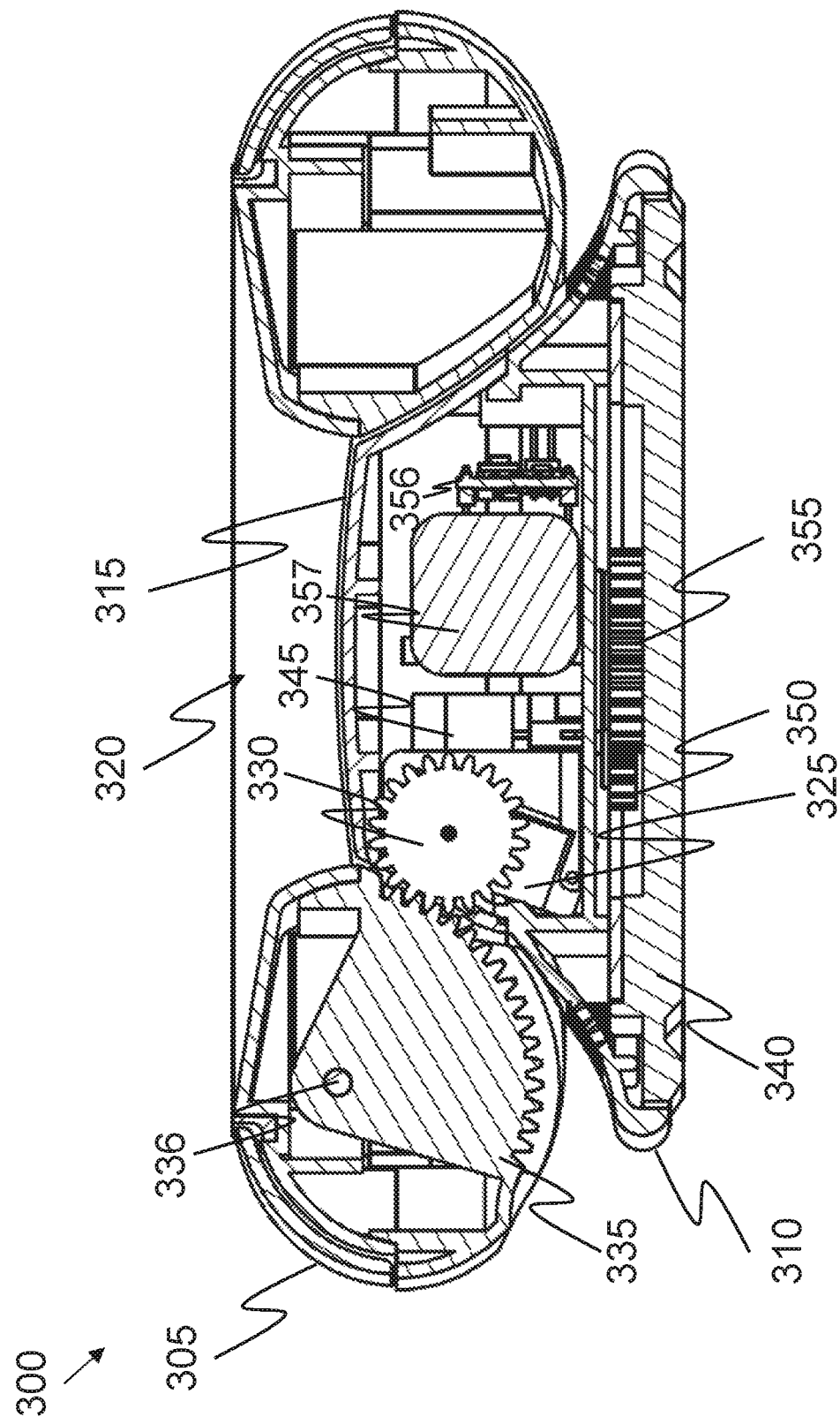
FIG. 3 shows a cross-sectional view of another example of a robot in accordance with an embodiment of the present invention, the robot being in the audio output mode.

Referring to FIG. 3, there is shown schematically an example of a robot 300.

In this example, the robot 300 comprises a first motor 325. The first motor 325 is operable to move the first part 305 relative to the second part 310.

In this example, the first motor 325 is comprised in the second part 310 of the robot 300. In this example, the first motor 325 is a component of the second part 310 of the robot 300.

In this example, the first motor 325 is configured to drive a first gear member 330. In this example, the first gear member 330 is comprised in the second part 310 of the robot 300. In this example, the first gear member 330 is a component of the second part 310 of the robot 300. The driving of the first gear member 330 causes the first gear member 330 to rotate about a horizontal axis.

In this example, the first gear member 330 is configured to cooperate with another gear member 335. In this example, the other gear member 335 is comprised in the first part 305 of the robot 300. In this example, the other gear member 335 is a component of the first part 305 of the robot 300. In this example, the other gear member 335 is static with respect to the first part 305 of the robot 300. The cooperation between the first gear member 330 and the other gear member 335 causes the first part 305 and the second part 310 of the robot 300 to change from the first configuration relative to each other to the second configuration relative to each other.

In this example, the first part 305 is pivotable relative to the second part 310. In this example, rotation of the first gear member 330 causes the second part 310 to pivot about a pin 336. The pivoting is caused by the engagement of the first gear member 330 with the other gear member 335. In this example, the robot 300 is configured to vary the direction of rotation of the first gear member 330 to change from the audio output mode to the user interaction mode or vice versa. For example, rotating the first gear member 330 clockwise causes the other gear member 335 to pivot in an anticlockwise direction about the pin 336 and move the distal end of the first part 305 of the robot 300 away from the second part 310 of the robot 300. Rotating the first gear member 330 anticlockwise causes the other gear member 335 to pivot in a clockwise direction about the pin 336 and draw the distal end of the first part 305 of the robot 300 towards the second part 310 of the robot 300.

In this example, the robot 300 comprises a third part 340. In this example, the second part 310 is movable relative to the third part 340. Movement of the second part 310 relative to the third part 340 may involve the second part 310 moving while the third part 340 remains stationary, the third part 340 moving while the second part 310 remains stationary and/or the second part 310 moving while the third part 340 also moves.

The second part 310 and the third part 340 of the robot 300 are configurable in a first configuration relative to each other. The second part 310 and the third part 340 of the robot 300 are also configurable in a second, different configuration relative to each other.

In this example, the robot 300 comprises a second motor 345. In this example the second motor 345 is operable to move the second part 310 relative to the third part 340. Such movement may comprise rotation. The robot 300 may be configured such that the second part 310 can perform continuous horizontal rotation relative to the third part 340. In other words, the second part 310 may be able to complete a full rotation about the third part 340. In some examples, the second part 310 is able to complete more than one full rotation about the third part 340.

In this example, the second motor 345 is comprised in the second part 310 of the robot 300. In this example, the second motor 345 is a component of the second part 310 of the robot 300.

In this example, the second motor 345 is configured to drive a second gear member 350. In this example, the second gear member 350 is a component of the second part 310 of the robot 300. The driving of the second gear member 350 causes the second gear member 350 to rotate about a vertical axis.

In this example, the second gear member 350 is configured to cooperate with another gear member 355. The other gear member 355 is a component of the third part 340 of the robot 300. In this example the other gear 335 is static with respect to the third part 340 of the robot 300. The cooperation between the second gear member 350 and the other gear member 355 causes the second part 310 and the third part 340 of the robot 300 to change from the first configuration relative to each other to the second configuration relative to each other.

In this example, the second part 310 is rotatable relative to the third part 340. In this example, rotation of the second gear member 350 causes the second part 310 to rotate about the other gear member 355. The rotating is caused by the engagement of the second gear member 350 with the other gear member 355.

The second part 310 and the third part 340 of the robot 300 may be configurable in the first configuration relative to each other in the audio output mode and/or the user interaction mode. The second part 310 and the third part 340 of the robot 300 may be configurable in the second configuration relative to each other in the audio output mode and/or the user interaction mode. The second part 310 and the third part 340 of the robot 300 may be configurable in one configuration relative to each other when the robot 300 is in the audio output mode and in another configuration relative to each other when the robot 300 is in the user interaction mode. The second part 310 and the third part 340 of the robot 300 may be configurable in one configuration relative to each other when the robot 300 is in the audio output mode and in another configuration relative to each other when the robot 300 is in the audio output mode. The second part 310 and the third part 340 of the robot 300 may be configurable in one configuration relative to each other when the robot 300 is in the user interaction mode and in another configuration relative to each other when the robot 300 is in the user interaction mode.

The robot 300 may be configured to cause the second part 310 to move relative to the third part 340 to perform object-tracking. For example, the second part 310 may rotate relative to the third part 340 to facilitate object-tracking. Examples of objects include, but are not limited to, users, animals and the like. This may allow the robot 300 to configure itself to face a user.

As such, the robot 300 may have multiple degrees of freedom of movement.

In this example, the robot 300 comprises at least one microphone. The at least one microphone may be a component of the second part 310 of the robot 300.

The robot 300 may comprise one or more additional components, in addition to those described above. For example, the robot 300 may comprise one or more printed circuit boards (PCBs) 356, one or more batteries 357 etc.

As such the robot 300 comprises a first part 305, a second part 310 and a third part 340. The first part 305 is pivotally coupled to the second part 310. The second part 310 is rotatably coupled to the third part 340. The robot 300 is configured to cause the first part 305 to pivot relative to the second part 310 and/or to cause the second part 310 to rotate relative to the third part 340 in response to detecting one or more trigger events. The robot 300 may be configured to cause the first part 305 to pivot away from and/or towards the second part 310 in response to detecting the one or more trigger events.

Further, the disc-shaped robot 300 comprises a first part 305, a second part 310 and a third part 340. The robot 300 is configured to cause the first part 305 to pivot relative to the second part 310 and/or to cause the second part 310 to rotate relative to the third part 340.

Further, the robot 300 comprises a first part 305, a second part 310, a third part 340, a first motor 325 and a second motor 345. The first motor 325 is operable to cause the first part 305 to pivot relative to the second part 310. The second motor 345 is operable to cause the second part 310 to rotate relative to the third part 340.

As such, when the robot 300 wakes up, or changes to the user interaction mode, the robot 300 may lift up the first part 305 relative to the second part 310 and may also rotate the second part 310 relative to the third part 340 for example so that the first part 305 is facing towards a user.

Figure 4:
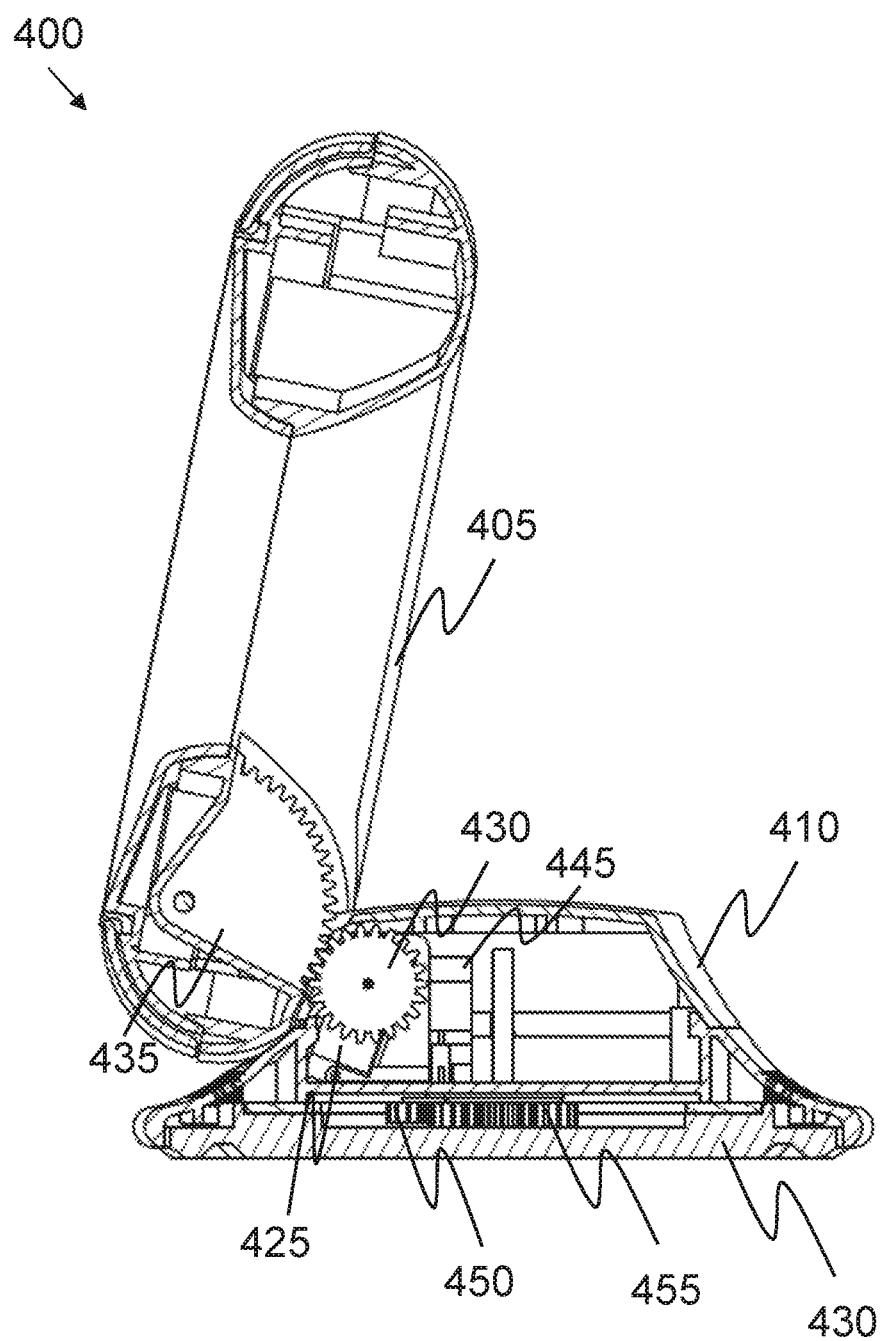
FIG. 4 shows a cross-sectional view of the example of the robot shown in FIG. 3, the robot being in the user interaction mode.

Referring to FIG. 4, there is shown schematically an example of a robot 400. In this example, the robot 400 is operating in the user interaction mode.

In this example, interaction between the first gear member 430 and the other gear member 435, as a result of the first motor 425 driving the first gear member 430, has resulted in reconfiguration of the first part 405 of the robot 400 with respect to the second part 410 of the robot.

The robot 400 may also, in the user interaction mode, use the second motor 445 to drive the second gear member 450 to cause the second gear member 450 to rotate. This, in turn, causes the second part 410 to rotate about the third part 440.

As such the robot 400 may have multiple degrees of freedom and may perform pivoting movement and/or rotational movement in the user interaction mode.

Figure 5:
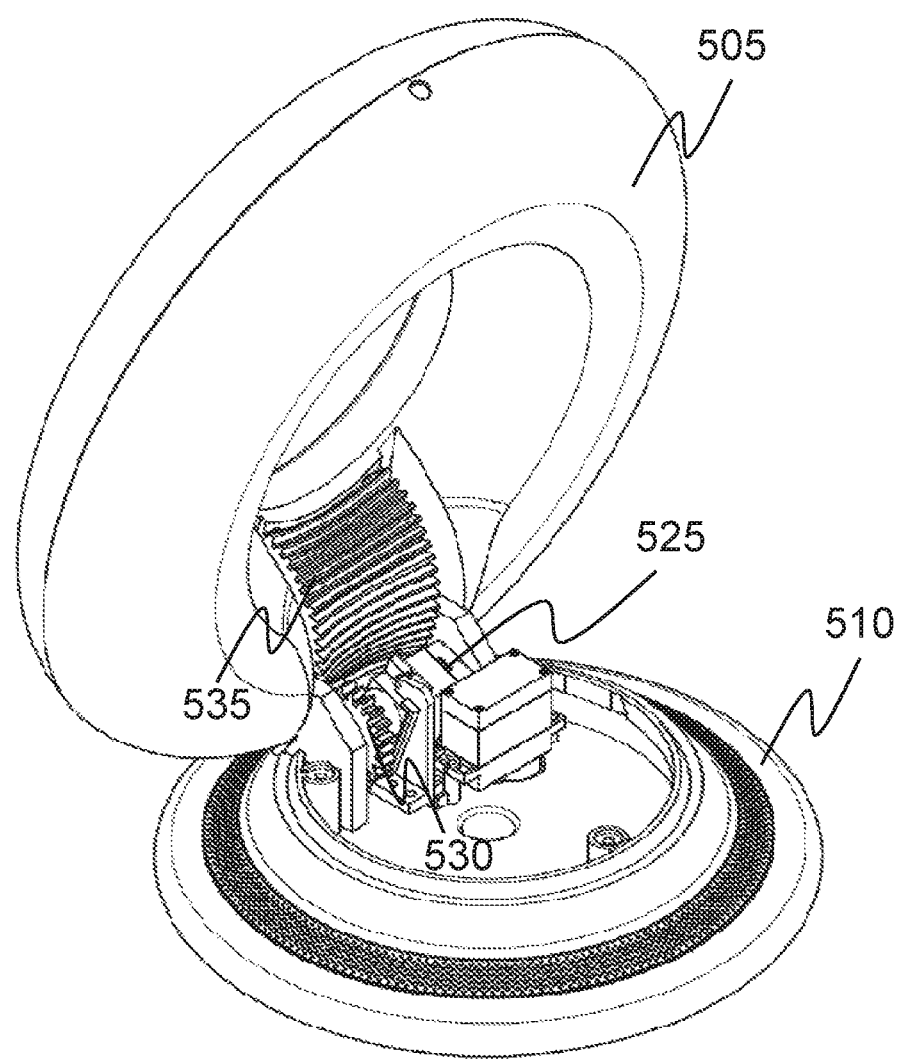
FIG. 5 shows a rear perspective view of another example of a robot in accordance with an embodiment of the present invention, the robot being in the user interaction mode.

Referring to FIG. 5, there is shown schematically an example of a robot 500.

In this example, part of the housing of the second part 510 of the robot 500 has been removed. The gear member 535 of the first part 505 of the robot 500 is visible in this example. The first motor 525 drives the first gear member 530.

Figure 6:
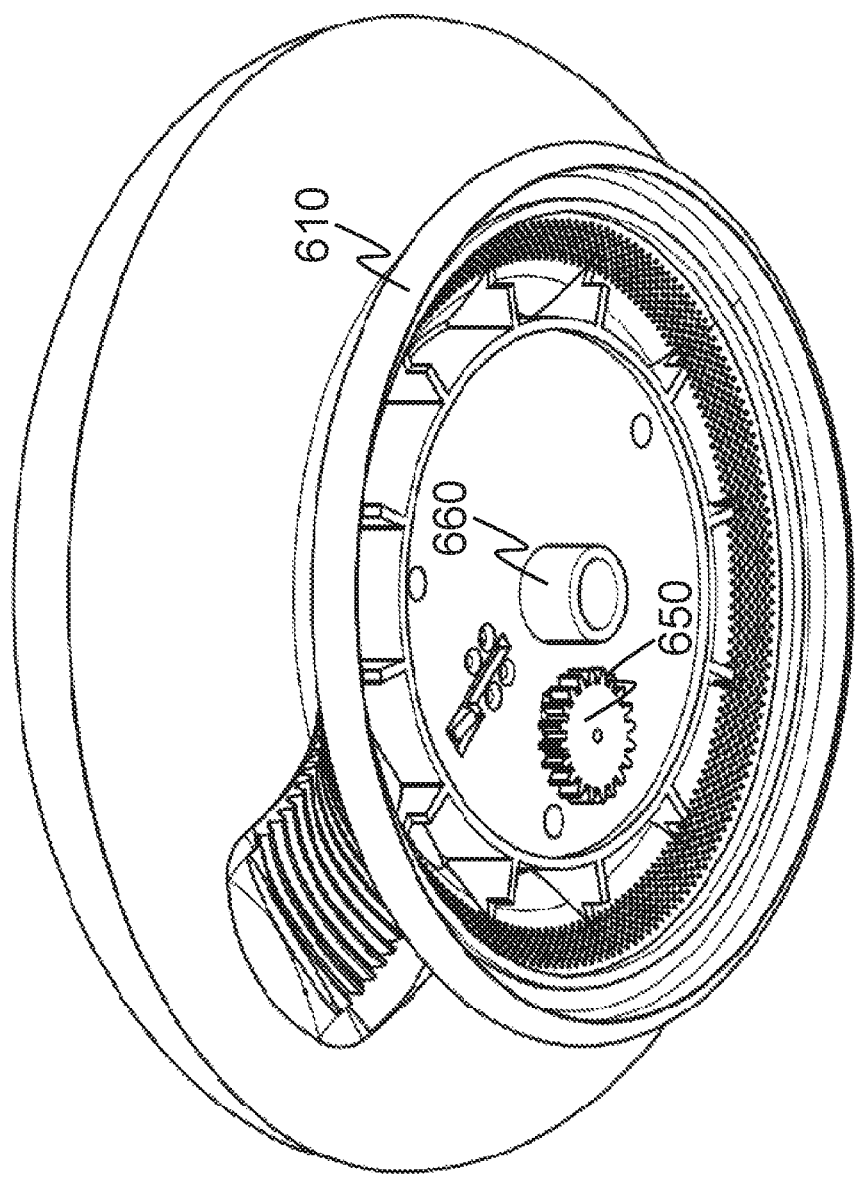
FIG. 6 shows an underneath perspective view of part of another example of a robot in accordance with an embodiment of the present invention.

Referring to FIG. 6, there is shown schematically an example of a robot 600.

In this example, the second part 610 of the robot 600 has a central tubular member 660. The gear member 650 of the second part 610 of the robot 600 is visible.

Figure 7:
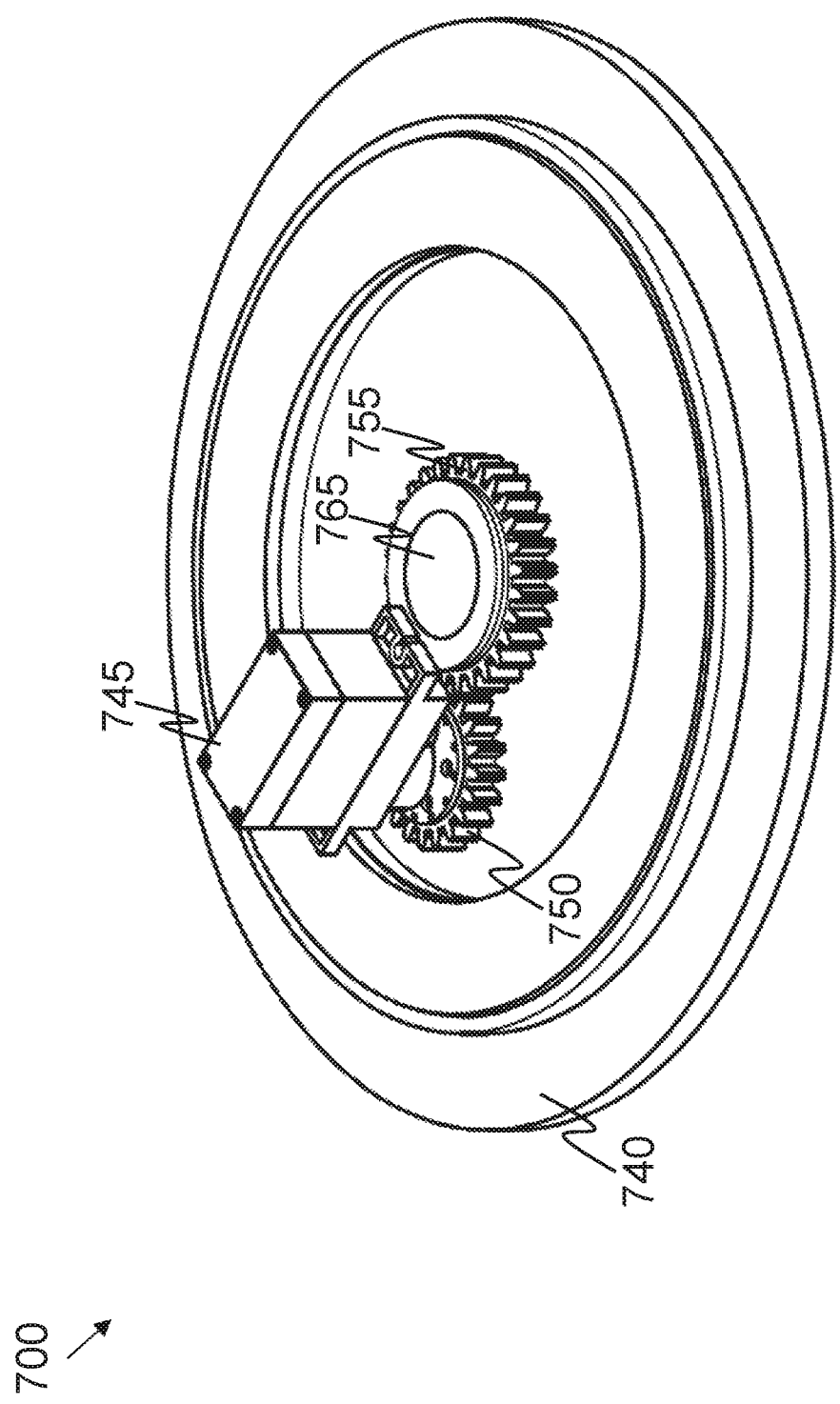
FIG. 7 shows a perspective view of part of another example of a robot in accordance with an embodiment of the present invention.

Referring to FIG. 7, there is shown schematically an example of part of a robot 700.

In this example, the third part 740 of the robot 700 has a central tubular member 765. The tubular member 660 of the second part 610 is configured to sit within the tubular member 765 of the third part 740 to facilitate rotation of the second part 610 relative to the third part 740, and allow cables to pass through from the second part 610 to the third part 740.

The second motor 745 of the second part of the robot and the gear member 750 of the second part of the robot 700 have been depicted.

Figure 8:
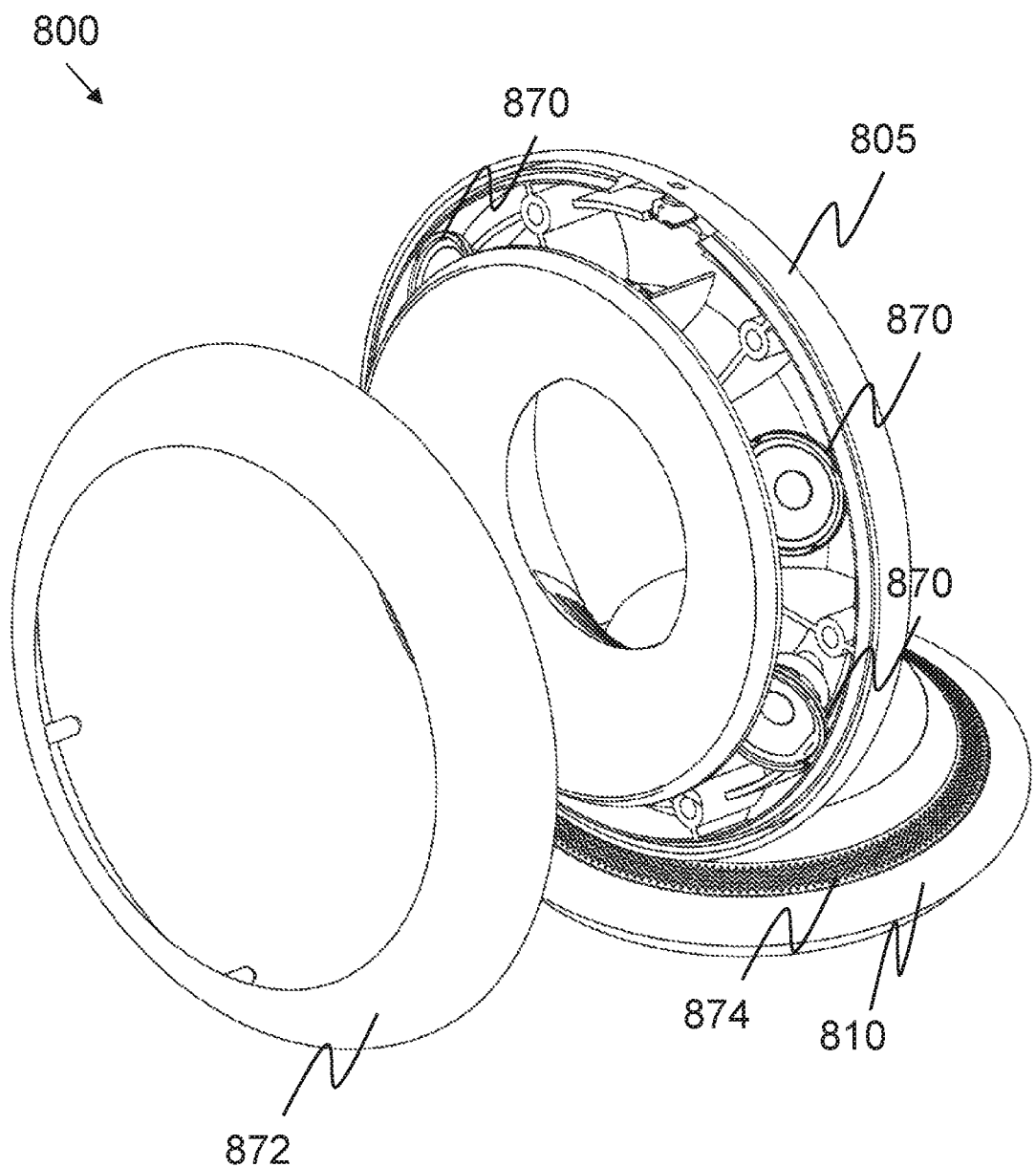
FIG. 8 shows an exploded front perspective view of another example of a robot in accordance with an embodiment of the present invention.

Referring to FIG. 8, there is shown schematically an example of a robot 800.

In this example, part of the covering 872 of the first part 805 of the robot 800 has been removed. The covering 872 of the first part 805 of the robot 800 is depicted as being solid. In some examples, the covering 872 of the first part 805 of the robot 800 is at least partially perforated. In this example, part of the covering 874 of the second part 810 of the robot 800 is at least partially perforated. In some examples, the covering 874 of the second part 810 of the robot 800 is solid.

In this example, the robot 800 comprises an array of speakers 870. The array of speakers 870 comprises a plurality of speakers. The array of speakers 870 is comprised in the first part 805 of the robot 800. The array of speakers 870 may be usable to provide omnidirectional audio output.

Figure 9:
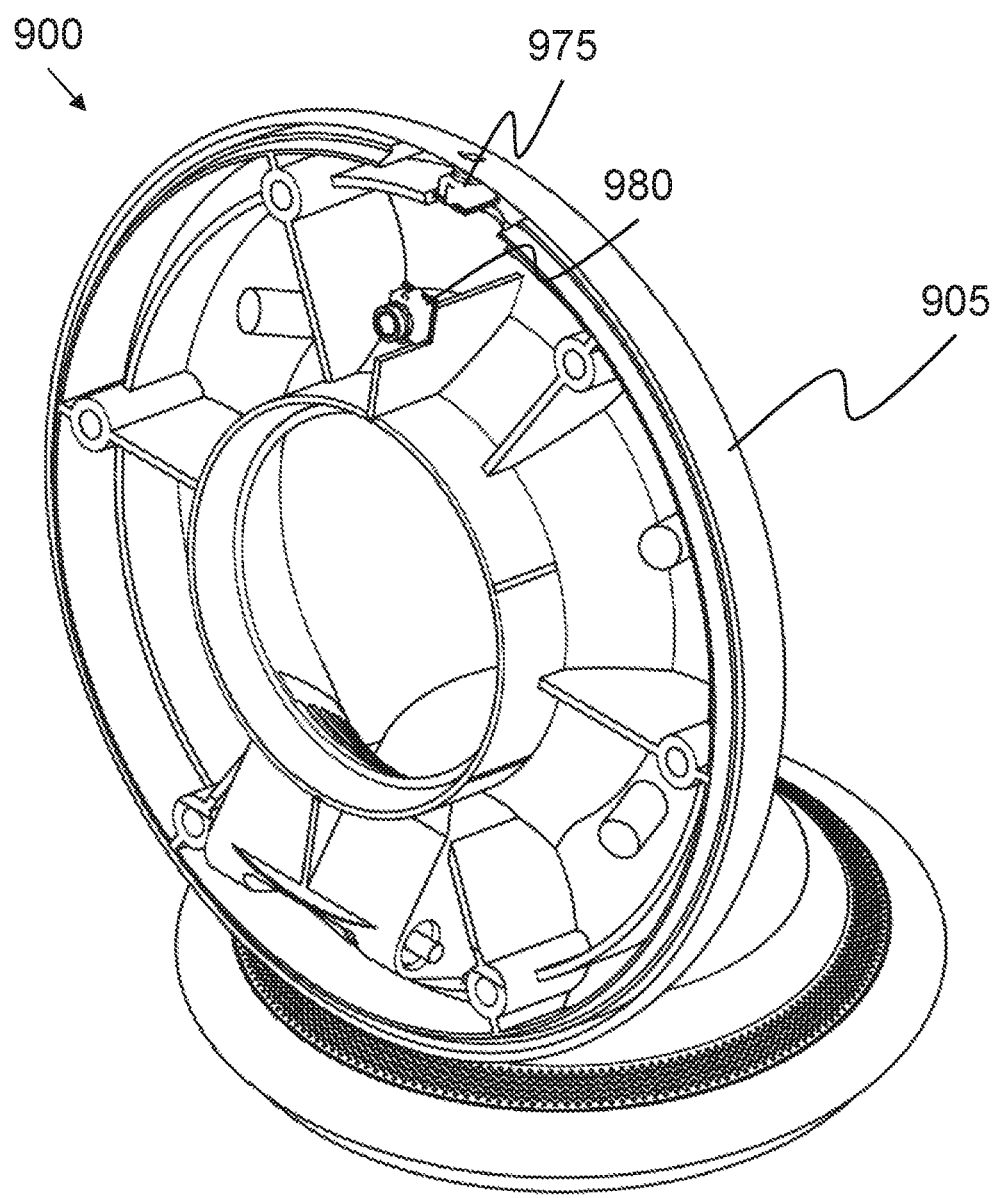
FIG. 9 shows a front perspective view of part of another example of a robot in accordance with an embodiment of the present invention.

Referring to FIG. 9, there is shown schematically an example of a robot 900. In this example, the robot 900 comprises a plurality of cameras. The plurality of cameras is comprised in the first part 905 of the robot 900. In some examples, one or more of the plurality of cameras is comprised in the second part of the robot 900.

In this example, a first camera 975 in the plurality of cameras has a first angle of view. In this example, a second camera 980 in the plurality of cameras has a second, different angle of view.

The first camera 975 may be configured as a primary camera in the audio output mode and the second camera 980 configured as the primary camera in the user interaction mode. The first camera 975 may be configured as a secondary camera in the user interaction mode and the second camera 980 may be configured as a secondary camera in the audio output mode. A primary camera may be preferred over a secondary camera in a given operating mode.

The first camera 975 may be configured to capture image data in the audio output mode and the second camera 980 configured to capture image data in the user interaction mode. In some examples, both the first camera 975 and the second camera 980 are configured to capture image data together in the audio output mode and/or the user interaction mode. The first camera 975 and/or the second camera 980 may be usable in performing object tracking, for example person tracking. As such, the first and second cameras 975, 980 may be configured to capture image data in both the audio output mode and the user interaction mode. The first camera 975 may be configured to facilitate object tracking in the audio output mode and the second camera 980 may be configured to facilitate object tracking in the user interaction mode. The first camera 975 and/or the second camera 980 may be used to determine a presence of a user. The presence of the user may be considered a trigger event.

Figure 10:
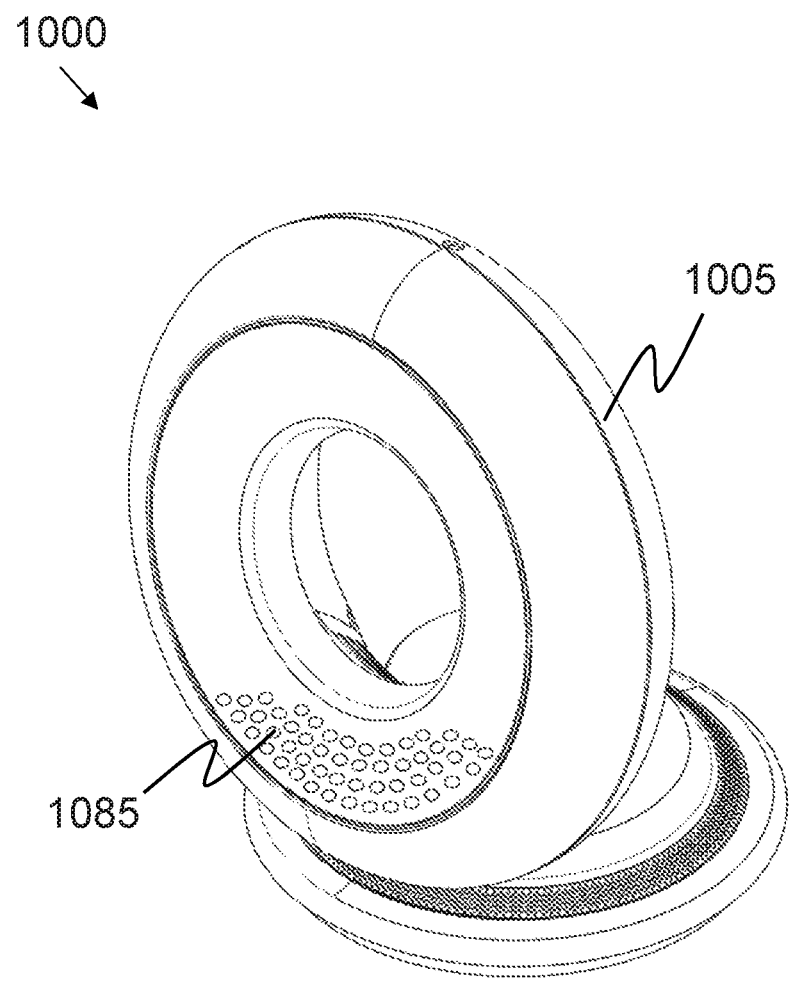
FIG. 10 shows a front perspective view of another example of a robot in accordance with an embodiment of the present invention, the robot being in the user interaction mode.

Referring to FIG. 10, there is shown schematically an example of a robot 1000.

In this example, the first part of the robot 1005 comprises at least one visual display region 1085. The at least one visual display region 1085 may comprise a plurality of light-emitting diodes (LEDs). The information conveyed by the at least one visual display region 1085 may vary based on user interaction.

Figure 11:
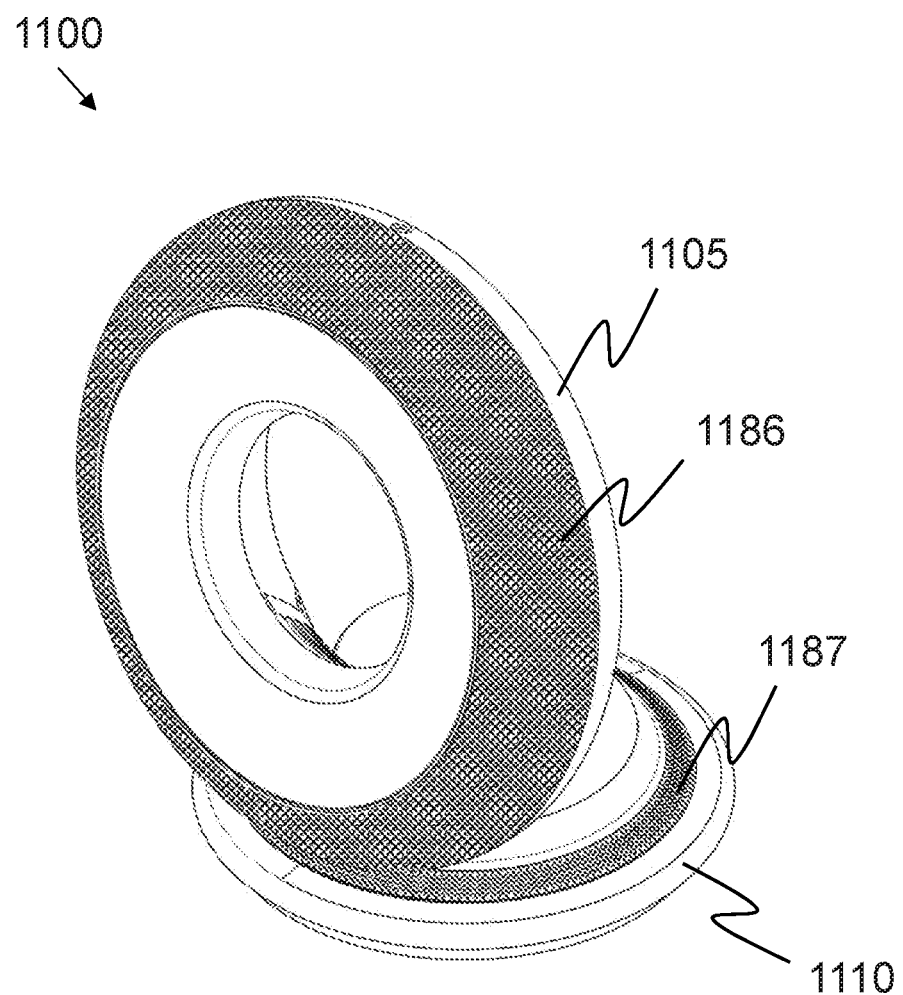
FIG. 11 shows a perspective view of another example of a robot in accordance with an embodiment of the present invention, the robot being in the user interaction mode.

Referring to FIG. 11, there is shown schematically an example of a robot 1100.

In this example, the first part 1105 of the robot 1100 comprises a perforated surface region 1186. The perforated surface region 1186 comprises a plurality of holes. The perforated surface region 1186 may facilitate transmission of sounds generated by one or more speakers in the first part 1105.

In this example, the second part 1110 of the robot 1100 comprises a perforated surface region 1187. The perforated surface region 1187 comprises a plurality of holes. The perforated surface region 1187 may facilitate ventilation of components of the second part 1110. The perforated surface region 1187 may facilitate detection of sounds by one or more microphones in the second part 1110.

Figure 12:
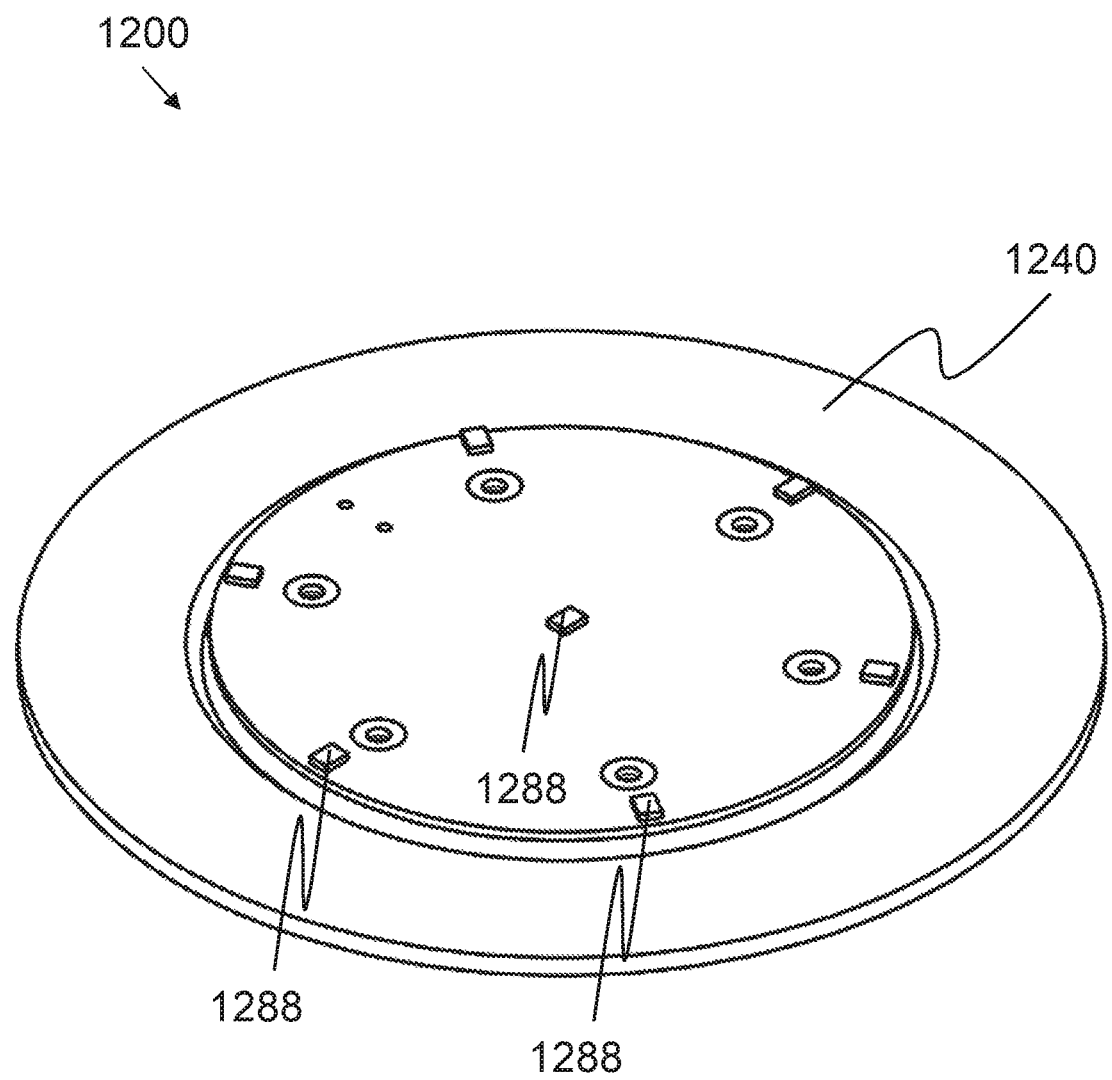
FIG. 12 shows a perspective view of part of another example of a robot in accordance with an embodiment of the present invention.

Referring to FIG. 12, there is shown schematically an example of part of a robot 1200.

The third part 1240 comprises an array of microphones 1288. In this example, the array of microphones 1288 comprises seven microphones. However, another number of microphones could be used.

Figure 13:
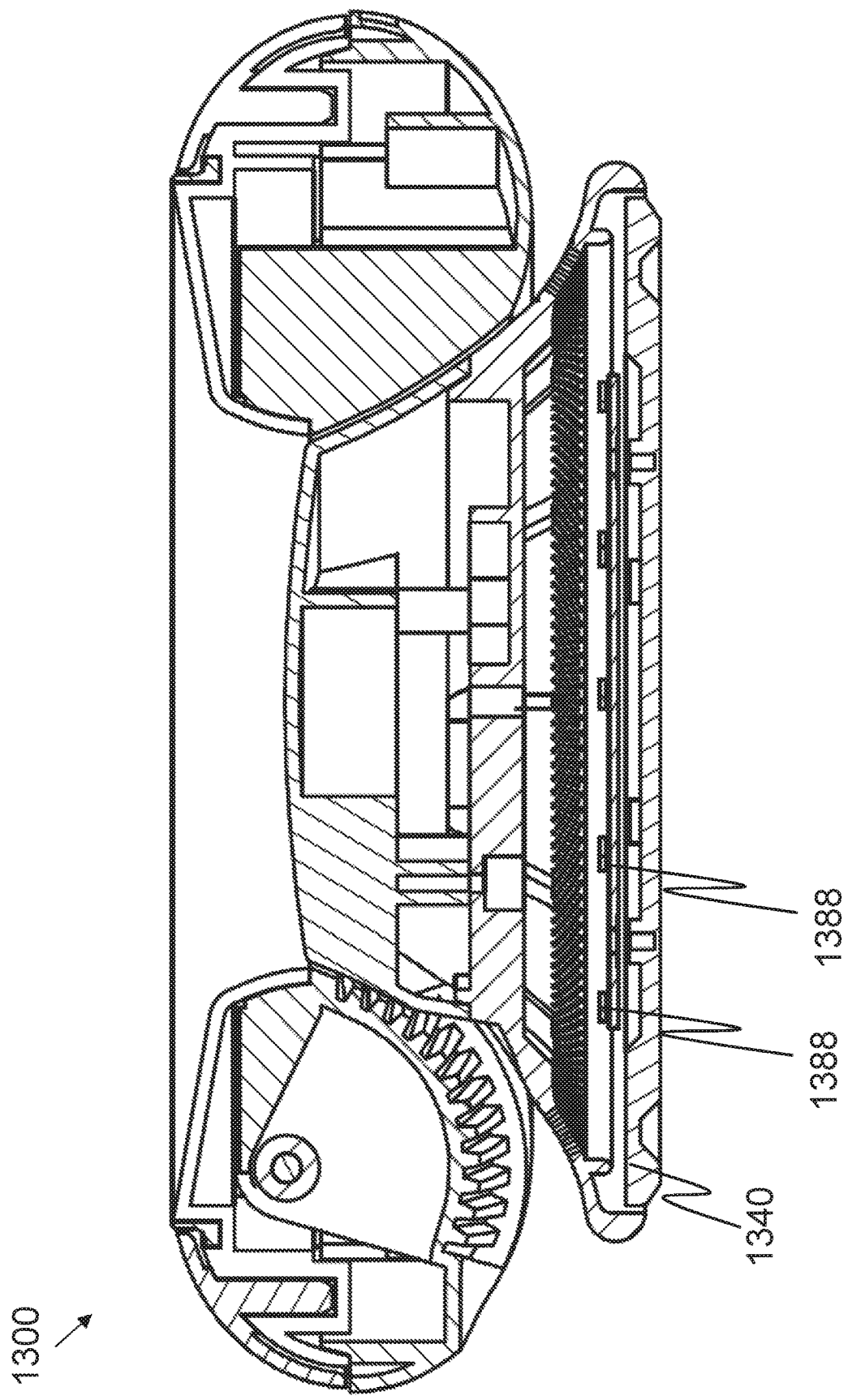
FIG. 13 shows a cross-sectional view of another example of a robot in accordance with an embodiment of the present invention, the robot being in the audio output mode.

Referring to FIG. 13, there is shown schematically an example of part of a robot 1300.

Figure 14:
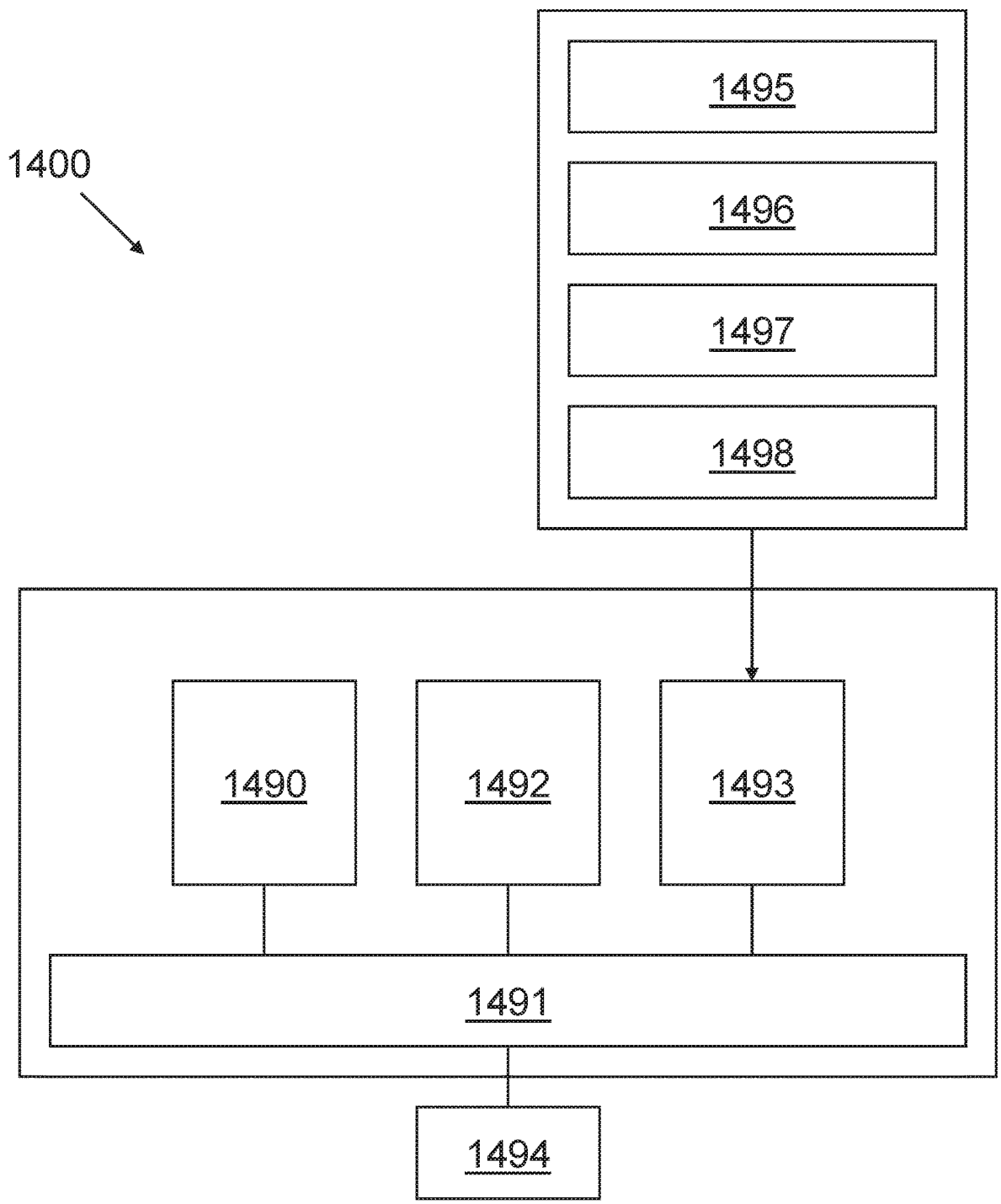
FIG. 14 shows a schematic block diagram of an example of a device in accordance with an embodiment of the present invention.

In this example, the third part 1340 comprises an array of microphones 1388. Referring to FIG. 14, there is shown a block diagram of a device 1400. The apparatus is configured to process data. The device 1400 may take various different forms, for example a robot.

In this example, the device 1400 comprises one or more processors 1490 configured to process information and/or instructions. The one or more processors 1490 may comprise a central processing unit (CPU). The one or more processors 1490 are coupled with a bus 1491. Operations performed by the one or more processors 1490 may be carried out by hardware and/or software.

In this example, the device 1400 comprises computer-useable volatile memory 1492 configured to store information and/or instructions for the one or more processors 1490. The computer-useable volatile memory 1492 is coupled with the bus 1491. The computer-useable volatile memory 1492 may comprise random access memory (RAM).

In this example, the device 1400 comprises computer-useable non-volatile memory 1493 configured to store information and/or instructions for the one or more processors 1490. The computer-useable non-volatile memory 1493 is coupled with the bus 1491. The computer-useable non-volatile memory 1493 may comprise read-only memory (ROM).

In this example, the device 1400 comprises one or more input/output (I/O) devices 1494 configured to communicate information to the one or more processors 1490. The one or more I/O devices 1494 are coupled with the bus 1491. The one or more I/O devices 1494 may comprise at least one network interface. Examples of network interfaces include, but are not limited to, Bluetooth and Wi-Fi interfaces. The at least one network interface may enable the apparatus 1400 to communicate via one or more data communications networks. Examples of data communications networks include, but are not limited to, the Internet, a Local Area Network (LAN) and a wide area network (WAN). The one or more I/O devices 1494 may enable a user to provide input to the device 1400 via one or more input devices (not shown). The one or more I/O devices 1494 may enable information to be provided to a user via one or more output devices (not shown).

Various other entities are depicted for the device 1400. For example, when present, an operating system 1495, a control system 1496, one or more modules 1497, and data 1498 are shown as residing in one, or a combination, of the computer-usable volatile memory 1492 and the computer-usable non-volatile memory 1493. The data processing system 1496 may be implemented by way of computer program code stored in memory locations within the computer-usable non-volatile memory 1493 and/or other tangible computer-readable storage media.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

It will be appreciated that the device 1400 may comprise more, fewer and/or different components from those depicted in FIG. 14. For example, a device could comprise one or more data storage units configured to store information and/or instructions.

Various measures (for example robots, methods, computer programs and computer-readable media) are provided in which a robot comprises a first part and a second part movable relative to the first part. The robot operates in an audio output mode in which the first and second parts are in a first configuration relative to each other and in which the robot is operable to output audio from an array of speakers using a first audio output technique and to operate in a user interaction mode in which the first and second parts are in a second, different configuration relative to each other and in which the robot is operable to interact with a user of the robot. The robot changes from the audio output mode to the user interaction mode in response to the robot detecting a first trigger event.

In some examples, changing from the audio output mode to the user interaction mode comprises causing the first part to lift up relative to the second part.

In some examples, the first part is pivotable relative to the second part.

In some examples, changing from the audio output mode to the user interaction mode comprises varying an angle subtended between one or more reference features of the first part and one or more reference features of the second part.

In some examples, the first part comprises a pivot end about which the first part is pivotable relative to the second part, and a distal end relative to the pivot end, wherein changing from the audio output mode to the user interaction mode comprises causing the distal end to move away from the second part.

In some examples, changing from the user interaction mode to the audio output mode comprises causing the distal end of the first part to move towards the second part.

In some examples, the first part is toroidal in shape and the second part comprises a raised region corresponding to a hole in the first part.

In some examples, the first part is configured to be in contact with the raised region of the second part when the first and second parts of the robot are in the first configuration relative to each other.

In some examples, the first part is configured not to be in contact with the raised region of the second part when the first and second parts of the robot are in the second configuration relative to each other.

In some examples, the robot is disc-shaped in the audio output mode.

In some examples, the robot comprises a first motor, the first motor being operable to move the first part relative to the second part.

In some examples, the first motor is comprised in the second part of the robot.

In some examples, the first motor is configured to drive a first gear member comprised in the second part of the robot, wherein the first gear member is configured to cooperate with a gear member comprised in the first part of the robot to cause the first and second parts of the robot to change from the first configuration relative to each other to the second configuration relative to each other.

In some examples, the robot comprises a third part, the second part being movable relative to the third part, wherein the second and third parts of the robot are configurable in a first configuration relative to each other and wherein the second and third parts of the robot are configurable in a second, different configuration relative to each other.

In some examples, the second part is rotatable relative to the third part.

In some examples, the robot comprises a second motor, the second motor being operable to move the second part relative to the third part.

In some examples, the second motor is comprised in the second part of the robot.

In some examples, the second motor is configured to drive a second gear member that is a component of the second part of the robot, wherein the second gear member is configured to cooperate with a gear member that is a component of the third part of the robot to cause the second and third parts of the robot to change from the first configuration relative to each other to the second configuration relative to each other.

In some examples, the second and third parts of the robot are configurable in the first configuration relative to each other in the audio output mode and/or the user interaction mode and the second and third parts of the robot are configurable in the second configuration relative to each other in the audio output mode and/or the user interaction mode.

In some examples, the robot is configured to cause the second part to move relative to the third part to perform object-tracking.

In some examples, the first audio output technique is an omnidirectional audio output technique.

In some examples, the robot outputs audio from some or all of the array of speakers using a second, different audio output technique in the user interaction mode.

In some examples, the array of speakers is comprised in the first part.

In some examples, the robot performs at least one function differently for different users.

In some examples, the robot performs the at least one function based on an identity of the user of the robot.

In some examples, the robot determines at least one personality characteristic based on the identity of the user and performs the at least one function based on the determined at least one personality characteristic.

In some examples, the robot performs the at least one function in the audio output mode.

In some examples, the robot performs the at least one function in the user interaction mode.

In some examples, the robot performs at least one predetermined function in one of the audio output mode and the user interaction mode and does not perform the at least one predetermined function in the other of the audio output mode and the user interaction mode.

In some examples, the first trigger event is a first predetermined voice command.

In some examples, the first trigger event is a presence of the user of the robot.

In some examples, the first trigger event is a current time of day being a first predetermined time of day.

In some examples, the robot changes from the user interaction mode to the audio output mode in response to the robot detecting a second trigger event.

In some examples, the second trigger event is a second predetermined voice command.

In some examples, the second trigger event is an absence of the user of the robot.

In some examples, the second trigger event is a current time of day being a second predetermined time of day.

In some examples, the second trigger event is expiry of a predetermined time period.

In some examples, the predetermined time period is associated with an amount of time since a most recent interaction with the user of the robot.

In some examples, the robot comprises at least one camera.

In some examples, the at least one camera is comprised in the first part of the robot.

In some examples, the robot comprises a plurality of cameras.

In some examples, a first camera in the plurality of cameras has a first angle of view and a second camera in the plurality of cameras has a second, different angle of view.

In some examples, the first camera is configured as a primary camera in the audio output mode and the second camera is configured as the primary camera in the user interaction mode.

In some examples, the first camera is configured to capture image data in the audio output mode and the second camera is configured to capture image data in the user interaction mode.

In some examples, the first and second cameras are configured to capture image data in both the audio output mode and the user interaction mode.

In some examples, the first part of the robot comprises at least one visual display region.

In some examples, the robot comprises at least one microphone.

In some examples, the at least one microphone is a component of the second part of the robot.

In some examples, robot comprises an array of microphones comprising at least three microphones. The robot is configured to use the array of microphones to determine a direction of a source of a voice command.

In some examples, the robot is an autonomous robot.

In some examples, the robot is a social robot.

Various measures (for example robots, methods, computer programs and computer-readable media) are provided in which robot comprises a first part, a second part and a third part. The first part is pivotally coupled to the second part and the second part is rotatably coupled to the third part. The robot causes the first part to pivot relative to the second part and/or causes the second part to pivot relative to the third part in response to detecting one or more trigger events.

Various measures (for example robots, methods, computer programs and computer-readable media) are provided in which a disc-shaped robot comprises a first part, a second part and a third part. The robot causes the first part to pivot relative to the second part and/or causes the second part to pivot relative to the third part.

Various measures (for example robots, methods, computer programs and computer-readable media) are provided in which a robot comprises a first part, a second part, a third part, a first motor and a second motor. The first motor is operable to cause the first part to pivot relative to the second part and the second motor is operable to cause the second part to rotate relative to the third part.

Various measures (for example devices, methods, computer programs and computer-readable media) are provided in which a device comprises a first part and a second part movable relative to the first part. The device operates in a first operating mode in which the first and second parts are in a first configuration relative to each other and to operate in a second, different operating mode in which the first and second parts are in a second, different configuration relative to each other. The device changes from the first operating mode to the second operating mode in response to the device detecting a first trigger event.

The above embodiments are to be understood as illustrative examples. Further embodiments are envisaged.

In examples described above, the robot is operable to output audio from an array of speakers. In other examples, the robot is operable to output audio from a single speaker.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A robot comprising a first part and a second part movable relative to the first part, the robot being configured to operate in an audio output mode in which the first and second parts are in a first configuration relative to each other and in which the robot is operable to output audio from an array of speakers using a first audio output technique and to operate in a user interaction mode in which the first and second parts are in a second, different configuration relative to each other and in which the robot is operable to interact with a user of the robot, wherein the robot is configured to change from the audio output mode to the user interaction mode in response to the robot detecting a first trigger event, wherein changing from the audio output mode to the user interaction mode comprises causing the first part to lift up relative to the second part.

2. A robot according to claim 1, wherein changing from the audio output mode to the user interaction mode comprises varying an angle subtended between one or more reference features of the first part and one or more reference features of the second part.

3. A robot according to claim 1, wherein the first part is toroidal in shape and the second part comprises a raised region corresponding to a hole in the first part.

4. A robot according to claim 3, wherein the first part is configured to be in contact with the raised region of the second part when the first and second parts of the robot are in the first configuration relative to each other.

5. A robot according to claim 3, wherein the first part is configured not to be in contact with the raised region of the second part when the first and second parts of the robot are in the second configuration relative to each other.

6. A robot according to claim 1, wherein the robot is disc-shaped in the audio output mode.

7. A robot according to claim 1, wherein the robot is operable to output audio from some or all of the array of speakers using a second, different audio output technique in the user interaction mode.

8. A robot according to claim 1, the robot being configured to perform at least one function differently for different users.

9. A robot according to claim 1, the robot being configured to change from the user interaction mode to the audio output mode in response to the robot detecting a second trigger event.

10. A robot according to claim 9, wherein the second trigger event is a second predetermined voice command.

11. A robot according to claim 9, wherein the second trigger event is an absence of the user of the robot.

12. A robot according to claim 9, wherein the second trigger event is a current time of day being a second predetermined time of day.

13. A robot according to claim 9, wherein the second trigger event is expiry of a predetermined time period.

14. A robot according to claim 13, wherein the predetermined time period is associated with an amount of time since a most recent interaction with the user of the robot.

15. A method of controlling a robot, the robot comprising a first part and a second part movable relative to the first part, the method comprising the robot:
 operating in an audio output mode in which the first and second parts are in a first configuration relative to each other and in which audio is output from an array of speakers using a first audio output technique;
 detecting a first trigger event;
 changing, in response to the detecting of the first trigger event, from the audio output mode to a user interaction mode in which the first and second parts are in a second, different configuration relative to each other and in which user interaction is conducted with a user of the robot; and
 operating in the user interaction mode,
 wherein changing from the audio output mode to the user interaction mode comprises causing the first part to lift up relative to the second part.

16. A method according to claim 15, wherein changing from the audio output mode to the user interaction mode comprises varying an angle subtended between one or more reference features of the first part and one or more reference features of the second part.

17. A method according to claim 15, comprising outputting audio from some or all of the array of speakers using a second, different audio output technique in the user interaction mode.

18. A method according to claim 15, comprising performing at least one function differently for different users.

19. A method according to claim 15, comprising:
 detecting a second trigger event; and
 changing from the user interaction mode to the audio output mode in response to the detecting of the second trigger event.

20. A device comprising a first part and a second part movable relatively to the first part, wherein the device is configured to operate in a first operating mode in which the first and second parts are in a first configuration relative to each other and to operative in a second operating mode in which the first and second parts are in a second, different configuration relative to each other, wherein the device is configured to change from the first operating mode to the second operating mode in response to the device detecting a first trigger event.

* * * * *